(12) United States Patent
Sun et al.

(10) Patent No.: US 12,333,251 B2
(45) Date of Patent: Jun. 17, 2025

(54) EXTRACTING TRIPLETS FROM TEXT WITH RELATIONSHIP PREDICTION MATRIX, ENTITY PREDICTION MATRIX, AND ALIGNMENT MATRIX

(71) Applicant: BEIJING BAIDU NETCOM SCIENCE TECHNOLOGY CO., LTD., Beijing (CN)

(72) Inventors: Jiandong Sun, Beijing (CN); Yabing Shi, Beijing (CN); Ye Jiang, Beijing (CN); Chunguang Chai, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 314 days.

(21) Appl. No.: 17/954,900

(22) Filed: Sep. 28, 2022

(65) Prior Publication Data
US 2023/0133717 A1 May 4, 2023

(30) Foreign Application Priority Data
Nov. 4, 2021 (CN) .......................... 202111300797.3

(51) Int. Cl.
*G06F 40/284* (2020.01)
*G06F 40/289* (2020.01)
*G06F 40/30* (2020.01)

(52) U.S. Cl.
CPC ............ *G06F 40/289* (2020.01); *G06F 40/30* (2020.01)

(58) Field of Classification Search
CPC .... G06F 40/279; G06F 40/284; G06F 40/289; G06F 40/30
(Continued)

(56) References Cited

U.S. PATENT DOCUMENTS 10,664,660 B2 * 5/2020 Li .......................... G06F 40/284
10,977,282 B2 * 4/2021 Nitta ..................... G06F 16/288
(Continued)

FOREIGN PATENT DOCUMENTS

| CN | 110310721 A | 10/2019 |
| CN | 111008276 A | 4/2020 |

(Continued)

OTHER PUBLICATIONS

Lin et al., "Relation Extraction Based on Label Constraints", 2020 IEEE 6th International Conference on Computer and Communications (ICCC), Dec. 11-14, 2020, pp. 2166 to 2170. (Year: 2020).*
(Continued)

*Primary Examiner* — Martin Lerner
(74) *Attorney, Agent, or Firm* — Brooks Kushman P.C.

(57) ABSTRACT

Disclosed are an information extraction method, an electronic device and a readable storage medium, which relate to the field of artificial intelligence technologies, and particularly to the field of knowledge graph technologies. The information extraction method includes: acquiring to-be-processed text to obtain a semantic vector of each token in the to-be-processed text; generating a relationship prediction matrix, an entity prediction matrix and an alignment matrix according to each token in the to-be-processed text and the semantic vector of each token; and extracting a target triplet in the to-be-processed text using the relationship prediction matrix, the entity prediction matrix and the alignment matrix, and taking the target triplet as an information extraction result of the to-be-processed text.

18 Claims, 5 Drawing Sheets

(58) Field of Classification Search
USPC .................................. 704/1, 9; 706/12, 15, 21
See application file for complete search history.

(56) References Cited

U.S. PATENT DOCUMENTS

| | | | | |
|---|---|---|---|---|
| 11,151,179 | B2* | 10/2021 | Li | G06F 40/289 |
| 2007/0282814 | A1* | 12/2007 | Gupta | G06F 40/20 |
| 2012/0323558 | A1* | 12/2012 | Nolan | G06F 40/30 |
| | | | | 704/9 |
| 2019/0122111 | A1* | 4/2019 | Min | G06N 3/045 |
| 2020/0073933 | A1* | 3/2020 | Zhao | G06F 40/295 |
| 2021/0216819 | A1* | 7/2021 | He | G06F 40/205 |
| 2021/0241050 | A1* | 8/2021 | Gunaratna | G06N 3/042 |
| 2022/0027766 | A1* | 1/2022 | Fang | G06F 40/284 |
| 2022/0309254 | A1* | 9/2022 | Kotnis | G06F 40/284 |
| 2023/0016403 | A1* | 1/2023 | Wang | G06F 40/30 |
| 2023/0087667 | A1* | 3/2023 | Dash | G06F 40/284 |
| | | | | 706/20 |
| 2023/0103728 | A1* | 4/2023 | Liu | G06F 40/30 |
| | | | | 704/9 |

FOREIGN PATENT DOCUMENTS

| | | | | |
|---|---|---|---|---|
| CN | 111444305 | A | | 7/2020 |
| CN | 113568969 | A1 | | 10/2021 |
| CN | 113590784 | A | | 11/2021 |
| WO | 2021135910 | A1 | | 7/2021 |
| WO | WO-2021147726 | A1 * | 7/2021 | ............ G06F 16/35 |
| WO | 2021212682 | A1 | | 10/2021 |

OTHER PUBLICATIONS

Sun et al., Cross-lingual Entity Alignment via Joint Attribute-Preserving Embedding, arXiv:1708.05045v2 [cs. CL] Sep. 26, 2017, 16 pages.
Extended European Search Report of European patent application No. 22200126.5 dated Mar. 24, 2023, 5 pages.
Zheng, et al., PRGC: Potential Relation and Global Correspondence Based Joint Relational Triple Extraction, arXiv:2106.09895v1 [cs. CL] Jun. 18, 2021, 11 pages.
Pang et al., A Deep Neural Network Model for Joint Entity and Relation Extraction, IEEE Access, vol. 7, 179143 to 79150, Oct. 23, 2019.
Sun et al., Chinese Entity Relation Extraction Algorithms Based on COAE2016 Datasets, Journal of Shandong University (Natural Science), vol. 52, No. 9, Sep. 2017, 8 pages.

* cited by examiner

EXTRACTING TRIPLETS FROM TEXT WITH RELATIONSHIP PREDICTION MATRIX, ENTITY PREDICTION MATRIX, AND ALIGNMENT MATRIX

CROSS-REFERENCE TO RELATED APPLICATIONS

The present disclosure claims the priority and benefit of Chinese Patent Application No. 202111300797.3, filed on Nov. 4, 2021, entitled "INFORMATION EXTRACTION METHOD AND APPARATUS, ELECTRONIC DEVICE AND READABLE STORAGE MEDIUM." The disclosure of the above application is incorporated herein by reference in its entirety.

TECHNICAL FIELD

The present disclosure relates to the field of artificial intelligence technologies, and particularly to the field of knowledge graph technologies, and more particularly to an information extraction method, an electronic device and a readable storage medium.

BACKGROUND

Usually, a knowledge graph records hundreds of millions of real world facts using triplets, which may be written in a form of (subject, relationship, object), the subject and the object represent entities, and the relationship represents a link or an inherent feature between the subject and the object. In a related art, when information extraction is performed on text to obtain triplets, there exists a problem that overlap triplets, such as single-entity overlap triplets, entity-pair overlap triplets, subject-and-object overlap triplets, or the like, which exist in the text, may not be extracted.

SUMMARY

According to a first aspect of the present disclosure, there is provided an information extraction method, including: acquiring to-be-processed text to obtain a semantic vector of each token in the to-be-processed text; generating a relationship prediction matrix, an entity prediction matrix and an alignment matrix according to each token in the to-be-processed text and the semantic vector of each token; and extracting a target triplet in the to-be-processed text using the relationship prediction matrix, the entity prediction matrix and the alignment matrix, and taking the target triplet as an information extraction result of the to-be-processed text.

According to a second aspect of the present disclosure, there is provided an electronic device, including: at least one processor; and a memory connected with the at least one processor communicatively, wherein the memory stores instructions executable by the at least one processor to enable the at least one processor to perform the method as mentioned above.

According to a third aspect of the present disclosure, there is provided a non-transitory computer readable storage medium with computer instructions stored thereon, wherein the computer instructions are used for causing a computer to perform the method as mentioned above.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and mechanisms are omitted in the descriptions below.

Figure 1:
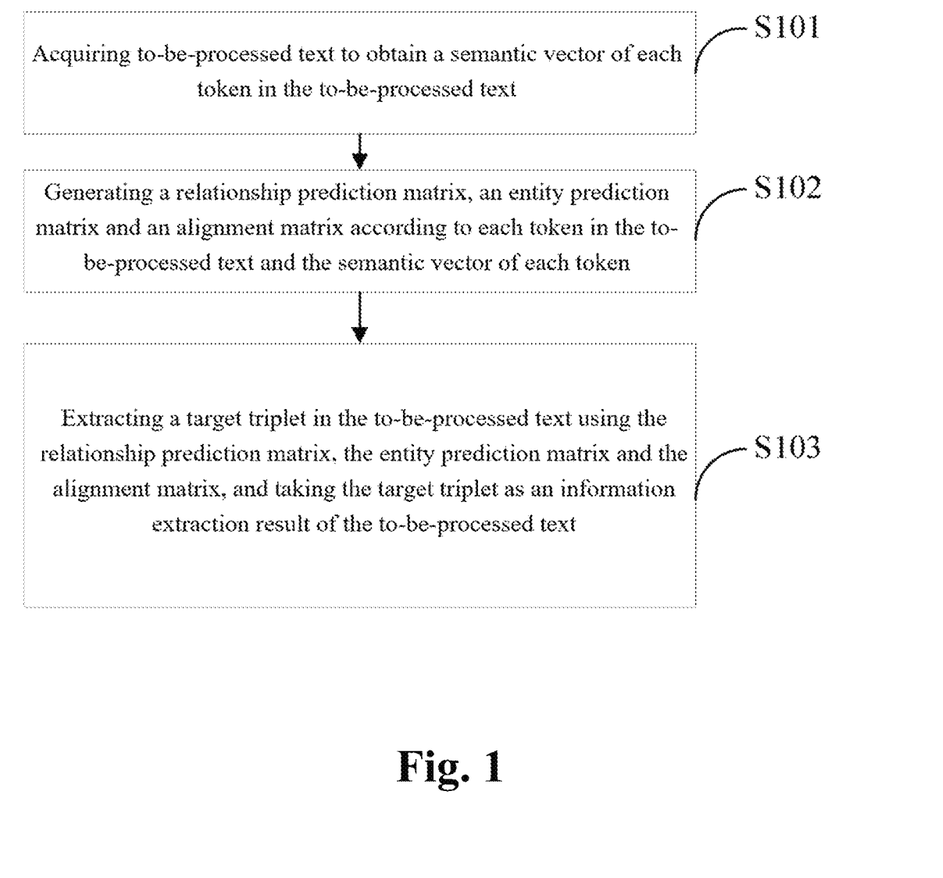
FIG. 1 is a schematic diagram according to a first embodiment of the present disclosure.

FIG. 1 is a schematic diagram according to a first embodiment of the present disclosure. As shown in FIG. 1, an information extraction method according to this embodiment includes the following steps:

S101: acquiring to-be-processed text to obtain a semantic vector of each token in the to-be-processed text;

S102: generating a relationship prediction matrix, an entity prediction matrix and an alignment matrix according to each token in the to-be-processed text and the semantic vector of each token; and S103: extracting a target triplet in the to-be-processed text using the relationship prediction matrix, the entity prediction matrix and the alignment matrix, and taking the target triplet as an information extraction result of the to-be-processed text.

The information extraction method according to this embodiment includes the steps of acquiring the to-be-processed text to obtain the semantic vector of each token in the to-be-processed text; then, generating the relationship prediction matrix, the entity prediction matrix and the alignment matrix according to each token in the to-be-processed text and the semantic vector of each token; and then, extracting the target triplet in the to-be-processed text using the generated relationship prediction matrix, entity prediction matrix and alignment matrix, and taking the extracted target triplet as the information extraction result of the to-be-processed text; in this embodiment, entities in the text and relationships between the entities are jointly identified using the three matrices generated by the tokens in the text and the semantic vectors of the tokens, such that on the one hand, overlap triplets in the text may be extracted, and application scenarios of information extraction are expanded, and on the other hand, an accuracy and efficiency of information extraction may be improved.

In this embodiment, during the S101 of acquiring to-be-processed text, text input at an input end may be used as the to-be-processed text, or text on the Internet may be acquired as the to-be-processed text.

In this embodiment, after the S101 of acquiring to-be-processed text, the semantic vector of each token (such as, Chinese Character or English word) in the to-be-processed text may be obtained according to the acquired to-be-processed text.

In this embodiment, during the S101 of obtaining a semantic vector of each token in the to-be-processed text, the to-be-processed text may be used as input of a pre-trained language model (for example, ERNIE), and an output result output by the pre-trained language model for each token in the to-be-processed text is used as the semantic vector of each token.

In this embodiment, after the S101 of acquiring to-be-processed text to obtain a semantic vector of each token in the to-be-processed text, the S102 of generating a relationship prediction matrix, an entity prediction matrix and an alignment matrix according to each token in the to-be-processed text and the semantic vector of each token is executed.

It may be understood that in this embodiment, a generation order of the relationship prediction matrix, the entity prediction matrix and the alignment matrix is not limited, and each matrix may be generated separately, or multiple matrices may be generated simultaneously; in this embodiment, the S102 of sequentially generating a relationship prediction matrix, an entity prediction matrix and an alignment matrix is taken as an example for description.

In this embodiment, the relationship prediction matrix generated in S102 is used to determine a subject start token and an object start token corresponding to a same relationship type in the to-be-processed text; in this embodiment, the entity prediction matrix generated in S102 is used to determine an entity start token and an entity end token corresponding to a same entity type in the to-be-processed text, thus obtaining a subject and an object corresponding to the same relationship type in the to-be-processed text according to the subject start token and the object start token corresponding to the same relationship type determined by the relationship prediction matrix; in this embodiment, the alignment matrix generated in S102 is used to determine whether the subject and the object corresponding to the same relationship type in the to-be-processed text belong to a same triplet.

Specifically, in this embodiment, during the S102 of generating the relationship prediction matrix according to each token in the to-be-processed text and the semantic vector of each token, an adopted optional implementation may include: acquiring at least one relationship type, each relationship type acquired in this embodiment including a relationship entity type and a relationship object type; taking the at least one relationship type as a row in the relationship prediction matrix, and taking each token in the to-be-processed text as a column in the relationship prediction matrix; and obtaining values of different elements in the relationship prediction matrix according to the semantic vector of the token of each column and the relationship type of each row, a token of a column in the relationship prediction matrix where an element with a value of 1 is located being a subject start token or an object start token of a relationship type of a row where the element is located.

For example, in this embodiment, in the relationship prediction matrix generated in S102, if a value of an element at a position of $(2k-1, i)$ is 1, entity $e_i$ starting with token $t_i$ is a subject of relationship type k; if a value of an element at a position of $(2k, i)$ is 1, entity $e_i$ starting with token $t_i$ is an object of relationship type k.

In this embodiment, during the S102 of obtaining values of different elements in the relationship prediction matrix according to the semantic vectors of the tokens of each column and the relationship types of each row, an adopted optional implementation may include: for each element in the relationship prediction matrix, determining a token and a relationship type corresponding to the element; performing calculation according to the semantic vector of the determined token and the determined relationship type to obtain a calculation result of the element, the calculation in this embodiment being similarity calculation, or the semantic vector of the token and the relationship type being input into a neural network model to obtain the calculation result output by the neural network model; and under a condition that the obtained calculation result is determined to exceed a first preset threshold, setting the value of the element to 1, otherwise, setting the value of the element to 0.

That is, in this embodiment, after the relationship prediction matrix is generated according to the relationship type and the tokens in the to-be-processed text, the subject and the object corresponding to the same relationship type are predicted by different rows in the relationship prediction matrix, thereby improving an accuracy of the predicted subject and object corresponding to the same relationship type.

Specifically, in this embodiment, during the S102 of generating an entity prediction matrix according to each token in the to-be-processed text and the semantic vector of each token, an adopted optional implementation may include: acquiring at least one entity type, each entity type acquired in this embodiment including an entity start type and an entity end type; taking the at least one entity type as a row in the entity prediction matrix, and taking each token in the to-be-processed text as a column in the entity prediction matrix; and obtaining values of different elements in the entity prediction matrix according to the semantic vector of the token of each column and the entity type of each row, a token of a column in the entity prediction matrix where an element with a value of 1 is located being an entity start token or an entity end token of an entity type of a row where the element is located.

For example, in this embodiment, in the entity prediction matrix generated in S102, if a value of an element at a position of $(2m-1, i)$ is 1, token $t_i$ is an entity start token of entity type m; if a value of an element at a position of $(2m, i)$ is 1, token $t_i$ is an entity end token of entity type m.

In this embodiment, during the S102 of obtaining values of different elements in the entity prediction matrix according to the semantic vector of the token of each column and the entity type of each row, an adopted optional implementation may include: for each element in the entity prediction matrix, determining a token and an entity type corresponding to the element; performing calculation according to the semantic vector of the determined token and the determined entity type to obtain a calculation result of the element, the calculation in this embodiment being similarity calculation, or the semantic vector of the token and the relationship type being input into a neural network model to obtain the calculation result output by the neural network model; and under a condition that the obtained calculation result is determined to exceed a second preset threshold, setting the value of the element to 1, otherwise, 0.

That is, in this embodiment, after the entity prediction matrix is generated according to the entity type and the tokens in the to-be-processed text, an entity corresponding to the same entity type is predicted by different rows in the entity prediction matrix, thereby improving an accuracy of the predicted entity corresponding to the same entity type.

Specifically, in this embodiment, during the S102 of generating the alignment matrix according to each token in the to-be-processed text and the semantic vector of each token, an adopted optional implementation may include: taking each token in the to-be-processed text both as a row and a column in the alignment matrix; and obtaining values of different elements in the alignment matrix according to the semantic vector of the token of each column and the semantic vector of the token of each row, token of a column and a row in the alignment matrix where an element with a value of 1 is located being entity end tokens of the same triplet.

For example, in this embodiment, in the alignment matrix generated in S102, if a value of an element at a position of (i, j) is 1, entity $e_i$ with $t_i$ as an end token and entity $e_j$ with $t_j$ as an end token belong to the same triplet.

In this embodiment, during the S102 of obtaining values of different elements in the alignment matrix according to the semantic vectors of the tokens of each column and the semantic vectors of the tokens of each row, an adopted optional implementation may include: for each element in the alignment matrix, determining a row token and a column token corresponding to the element; performing calculation according to a semantic vector of the determined row token and a semantic vector of the determined column token to obtain a calculation result of the element, the calculation in this embodiment being similarity calculation, or the semantic vector of the token and the relationship type being input into a neural network model to obtain the calculation result output by the neural network model; and under a condition that the obtained calculation result is determined to exceed a third preset threshold, setting the value of the element to 1, otherwise, setting the value of the element to 0.

That is, in this embodiment, after the alignment matrix is generated according to the tokens in the to-be-processed text, whether the row token and the column token corresponding to each element belong to the same triplet may be determined by the value of each element in the alignment matrix, thereby screening the triplets, and improving the accuracy of the obtained target triplet.

It may be understood that the first preset threshold, the second preset threshold, and the third preset threshold in this embodiment may correspond to a same value, or different values.

In this embodiment, after the S102 of generating a relationship prediction matrix, an entity prediction matrix and an alignment matrix, the S103 of extracting a target triplet in the to-be-processed text using the generated relationship prediction matrix, entity prediction matrix and alignment matrix, and then, taking the extracted target triplet as an information extraction result of the to-be-processed text is executed.

Specifically, in this embodiment, during the S103 of extracting a target triplet in the to-be-processed text using the generated relationship prediction matrix, entity prediction matrix and alignment matrix, an adopted optional implementation may include: determining a subject start token and an object start token corresponding to a same relationship type according to the relationship prediction matrix; determining an entity start token and an entity end token corresponding to a same entity type according to the entity prediction matrix; determining an entity and an object corresponding to the same relationship type in the to-be-processed text according to the subject start token and the object start token corresponding to the same relationship type, as well as the entity start token and the entity end token corresponding to the same entity type; combining the relationship types and the entities and the objects corresponding to the relationship types to obtain at least one candidate triplet; and selecting a triplet meeting a preset requirement from the obtained at least one candidate triplet as the target triplet according to the alignment matrix.

That is, in this embodiment, the target triplet is extracted from the to-be-processed text using the relationship prediction matrix, the entity prediction matrix and the alignment matrix sequentially, such that interference of overlap information may be avoided, all triplets included in the to-be-processed text may be extracted as far as possible, and the accuracy of the extracted target triplet is improved.

In this embodiment, during the S103 of determining a subject start token and an object start token corresponding to a same relationship type according to the relationship prediction matrix, an adopted optional implementation may include: taking an element with a value of 1 in the relationship prediction matrix as a target element; and taking a token of a column where the target element is located as a start token of a relationship subject type or a start token of a relationship object type of a row where the target element is located.

In this embodiment, during the S103 of determining an entity start token and an entity end token corresponding to a same entity type according to the entity prediction matrix, an adopted optional implementation may include: determining a target element with a value of 1 in the entity prediction matrix; and taking a token of a column where the determined target element is located as a start token of an entity start type or an end token of an entity end type of a row where the target element is located.

In this embodiment, during the S103 of selecting a triplet meeting a preset requirement from the obtained at least one candidate triplet as the target triplet according to the alignment matrix, an adopted optional implementation may include: for each candidate triplet, under a condition that a subject end token and an object end token in the candidate triplet are determined to have element values of 1 in the alignment matrix, taking the candidate triplet as the target triplet.

In the information extraction method according to this embodiment, the subject start token and the object start token corresponding to the same relationship type are determined according to the generated relationship prediction matrix, and the entity start token and the entity end token corresponding to the same entity type are determined according to the generated entity prediction matrix, such that a purpose of joint identification of the relationship between the entities is achieved, and the overlap triplets in the text may be extracted, thereby expanding application scenarios of information extraction, and further improving the accuracy and efficiency of information extraction.

For example, if to-be-processed text is "Company-A, Department B one No. 07 C-type drinking water machine being moved from the first floor to the second floor", in this embodiment, a subject start token "C-type" and an object start token "company-A" corresponding to a relationship type "allocation", as well as a subject start token "C-type" and an object start token "Company-A" corresponding to a relationship type "company belonged to" are predicted according to a relationship prediction matrix, and then, according to an entity prediction matrix, an entity corresponding to the subject start token "C-type" is determined to "C-type drinking water machine" and an entity corresponding to the object start token "Company-A" is determined to "Company-A" or "Company-A, Department B", and finally, target triples (C-type drinking water machine, company belonged to, Company-A) and (C-type drinking water machine, allocation, Company-A, Department B") are obtained according to an alignment matrix.

For example, if to-be-processed text is "city A is the capital city of country B", since different relationship types, for example, a relationship type "capital" and a relationship type "including", are set in a relationship prediction matrix in this embodiment, subjects and objects of corresponding relationship types are predicted in different rows, and thus, target triples (country B, capital, city A) and (country B, including, city A) may be extracted.

For example, if to-be-processed text is "Company-A, Department B has its No. 07 C-type drinking water machine being moved from the first floor to the second floor", and a target triplet extracted in this embodiment is (C-type drinking water machine, type, drinking water machine), since "C-type drinking water machine" is a type of "drinking water machine" entity, "drinking water machine" is a "machine type" entity, and different types of entities are predicted in different rows of an entity prediction matrix, the entities are not affected by each other, thus obtaining the target triplet.

Figure 2:
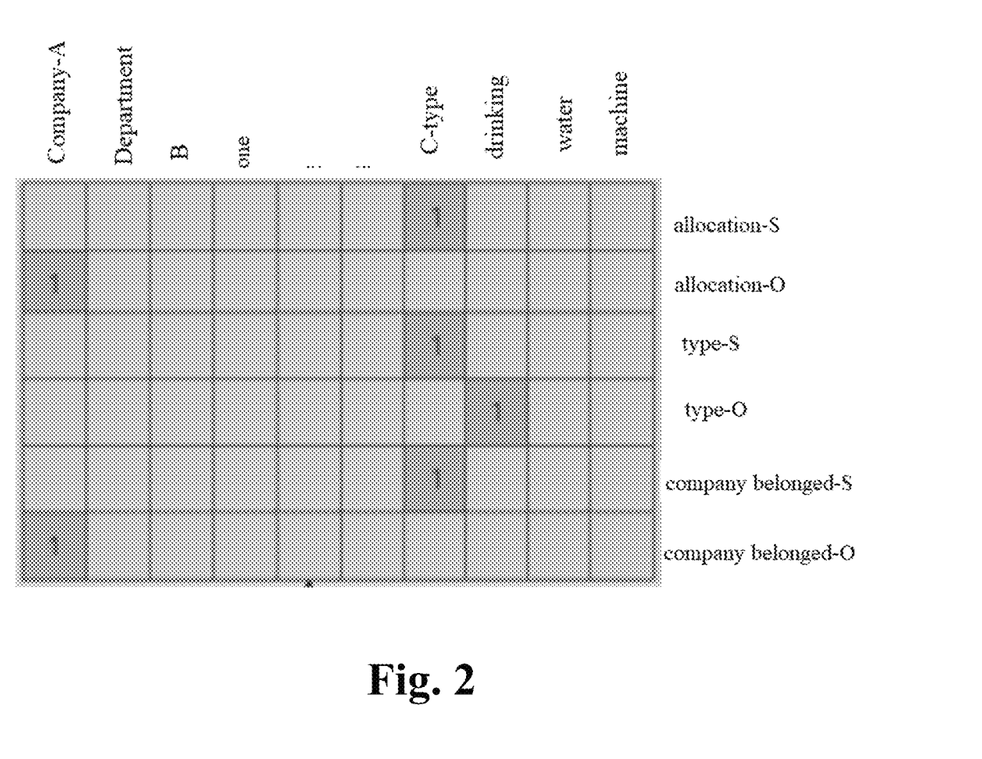
FIG. 2 is a schematic diagram according to a second embodiment of the present disclosure.

FIG. 2 is a schematic diagram according to a second embodiment of the present disclosure. A schematic diagram of a generated relationship prediction matrix is shown in FIG. 2, in which "allocation-S" represents a relationship subject type of a relationship type "allocation", and "allocation-O" represents a relationship object type of the relationship type "allocation"; the value of the element in the first row and the seventh column is 1, which indicates that the token "C-type" is a subject start token of the relationship type "allocation"; the value of the element in the second row and the first column is 1, which indicates that the token "Company-A" is an object start token of the relationship type "allocation".

Figure 3:
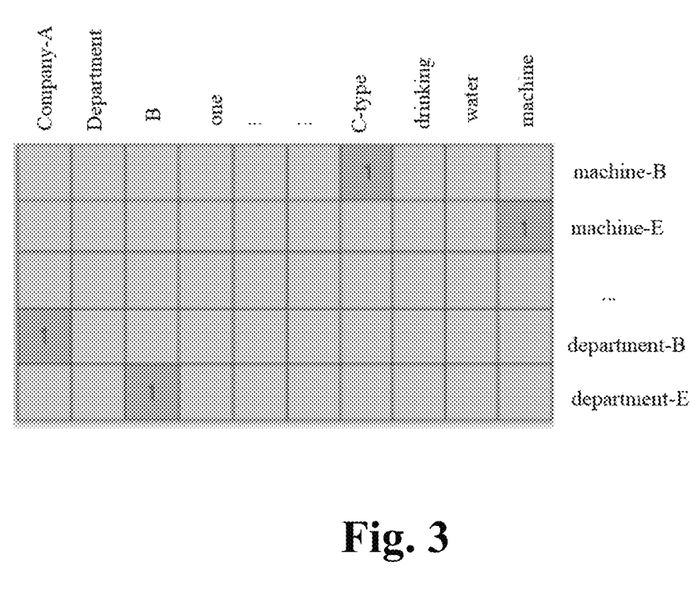
FIG. 3 is a schematic diagram according to a third embodiment of the present disclosure.

FIG. 3 is a schematic diagram according to a third embodiment of the present disclosure. A schematic diagram of a generated entity prediction matrix is shown in FIG. 3, in which "machine-B" represents an entity start token of an entity type "machine", and "machine-E" represents an entity end token of the entity type "machine"; the value of the element in the first row and the seventh column is 1, which indicates that the token "C-type" is the entity start token of the entity type "machine"; the value of the element in the second row and the tenth column is 1, which indicates that the token "machine" is an entity end token of the entity type "machine".

Figure 4:
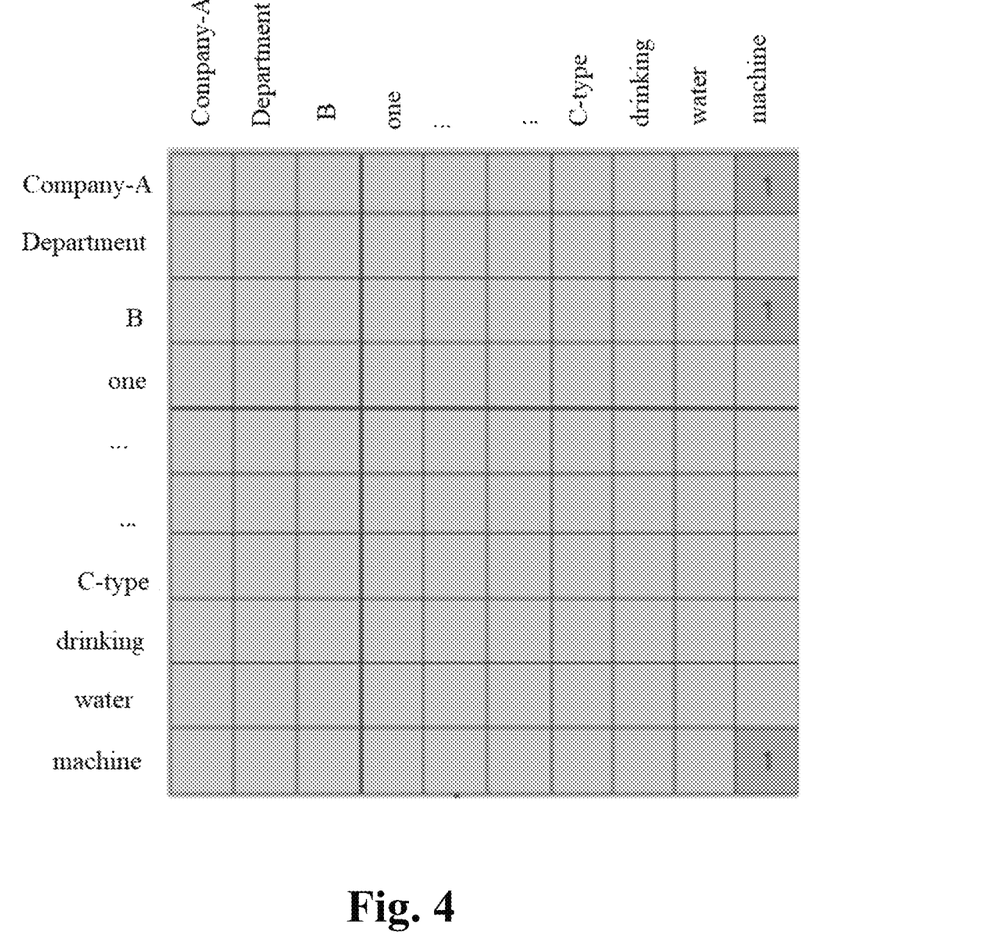
FIG. 4 is a schematic diagram according to a fourth embodiment of the present disclosure.

FIG. 4 is a schematic diagram according to a fourth embodiment of the present disclosure. A schematic diagram of a generated alignment matrix is shown in FIG. 4, in which the value of the element in the first row and the tenth column is 1, which indicates that an entity with the token "machine" as an end token and an entity with the token "Company-A" as an end token belong to a same triple.

Figure 5:
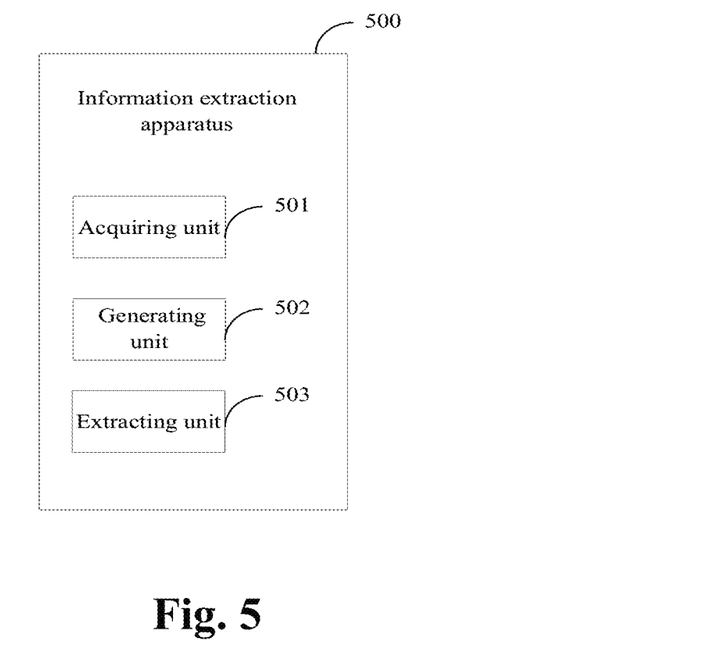
FIG. 5 is a schematic diagram according to a fifth embodiment of the present disclosure.

FIG. 5 is a schematic diagram according to a fifth embodiment of the present disclosure. As shown in FIG. 5, an information extraction apparatus 500 according to this embodiment includes an acquiring unit 501 configured to acquire to-be-processed text to obtain a semantic vector of each token in the to-be-processed text; a generating unit 502 configured to generate a relationship prediction matrix, an entity prediction matrix and an alignment matrix according to each token in the to-be-processed text and the semantic vector of each token; and an extracting unit 503 configured to extract a target triplet in the to-be-processed text using the relationship prediction matrix, the entity prediction matrix and the alignment matrix, and take the target triplet as an information extraction result of the to-be-processed text.

When the acquiring unit 501 acquires the to-be-processed text, text input at an input end may be used as the to-be-processed text, or text on the Internet may be acquired as the to-be-processed text.

After acquiring the to-be-processed text, the acquiring unit 501 may obtain the semantic vector of each token in the to-be-processed text according to the acquired to-be-processed text.

When the acquiring unit 501 obtains the semantic vector of each token in the to-be-processed text, the to-be-processed text may be used as input of a pre-trained language model, and an output result output by the pre-trained language model for each token in the to-be-processed text is used as the semantic vector of each token.

In this embodiment, after the acquiring unit 501 acquires the to-be-processed text to obtain the semantic vector of each token in the to-be-processed text, the generating unit 502 generates the relationship prediction matrix, the entity prediction matrix and the alignment matrix according to each token in the to-be-processed text and the semantic vector of each token.

It may be understood that in this embodiment, a generation order of the relationship prediction matrix, the entity prediction matrix and the alignment matrix is not limited, and each matrix may be generated separately, or multiple matrices may be generated simultaneously; in this embodiment, for example, the generating unit 502 sequentially generates the relationship prediction matrix, the entity prediction matrix and the alignment matrix.

The relationship prediction matrix generated by the generating unit 502 is used to determine a subject start token and an object start token corresponding to a same relationship type in the to-be-processed text; in this embodiment, the entity prediction matrix generated by the generating unit 502 is used to determine an entity start token and an entity end token corresponding to a same entity type in the to-be-processed text, thus obtaining a subject and an object corresponding to the same relationship type in the to-be-processed text according to the subject start token and the object start token corresponding to the same relationship type determined by the relationship prediction matrix; in this embodiment, the alignment matrix generated by the generating unit 502 is used to determine whether the subject and the object corresponding to the same relationship type in the to-be-processed text belong to a same triplet.

Specifically, when the generating unit 502 generates the relationship prediction matrix according to each token in the to-be-processed text and the semantic vector of each token, an adopted optional implementation may include: acquiring at least one relationship type, each relationship type acquired in this embodiment including a relationship entity type and a relationship object type; taking the at least one relationship type as a row in the relationship prediction matrix, and taking each token in the to-be-processed text as a column in the relationship prediction matrix; and obtaining values of different elements in the relationship prediction matrix according to the semantic vector of the token of each column and the relationship type of each row, herein a token of a column in the relationship prediction matrix where an element with the value of 1 is located being a subject start token or an object start token of a relationship type of a row where the element is located.

In this embodiment, when the generating unit 502 obtains the values of different elements in the relationship prediction matrix according to the semantic vector of the token of each column and the relationship type of each row, an adopted optional implementation may include: for each element in the relationship prediction matrix, determining a token and a relationship type corresponding to the element; performing calculation according to the semantic vector of the determined token and the determined relationship type to obtain a calculation result of the element; and under a condition that the obtained calculation result is determined to exceed a first preset threshold, setting the value of the element to 1, otherwise, setting the value of the element to 0.

That is, after generating the relationship prediction matrix according to the relationship type and the tokens in the to-be-processed text, the generating unit 502 predicts the subject and the object corresponding to the same relationship type by different rows in the relationship prediction matrix, thereby improving an accuracy of the predicted subject and object corresponding to the same relationship type.

Specifically, when the generating unit 502 generates the entity prediction matrix according to each token in the to-be-processed text and the semantic vector of each token, an adopted optional implementation may include: acquiring at least one entity type, each entity type acquired in this embodiment including an entity start type and an entity end type; taking the at least one entity type as a row in the entity prediction matrix, and taking each token in the to-be-processed text as a column in the entity prediction matrix; and obtaining values of different elements in the entity prediction matrix according to the semantic vector of the token of each column and the entity type of each row, a token of a column in the entity prediction matrix where an element with a value of 1 is located being an entity start token or an entity end token of an entity type of a row where the element is located.

When the generating unit 502 obtains the values of different elements in the entity prediction matrix according to the semantic vectors of the tokens of each column and the entity types of each row, an adopted optional implementation may include: for each element in the entity prediction matrix, determining a token and an entity type corresponding to the element; performing calculation according to the semantic vector of the determined token and the determined entity type to obtain a calculation result of the element; and under a condition that the obtained calculation result is determined to exceed a second preset threshold, setting the value of the element to 1, otherwise, 0.

That is, after generating the entity prediction matrix according to the entity type and the tokens in the to-be-processed text, the generating unit 502 predicts an entity corresponding to the same entity type by different rows in the entity prediction matrix, thereby improving an accuracy of the predicted entity corresponding to the same entity type.

Specifically, when the generating unit 502 generates the alignment matrix according to each token in the to-be-processed text and the semantic vector of each token, an adopted optional implementation may include: taking each token in the to-be-processed text both as a row and a column in the alignment matrix; and obtaining values of different elements in the alignment matrix according to the semantic vector of the token of each column and the semantic vector of the token of each row, tokens of a column and a row in the alignment matrix where an element with a value of 1 is located being entity end tokens of the same triplet.

When the generating unit 502 obtains the values of different elements in the alignment matrix according to the semantic vector of the token of each column and the semantic vector of the token of each row, an adopted optional implementation may include: for each element in the alignment matrix, determining a row token and a column token corresponding to the element; performing calculation according to a semantic vector of the determined row token and a semantic vector of the determined column token to obtain a calculation result of the element; and under a condition that the obtained calculation result is determined to exceed a third preset threshold, setting the value of the element to 1, otherwise, setting the value of the element to 0.

That is, after generating the alignment matrix according to the tokens in the to-be-processed text, the generating unit 502 may determine whether the row token and the column token corresponding to each element belong to the same triplet by the value of each element in the alignment matrix, thereby screening the triplets, and improving the accuracy of the obtained target triplet.

It may be understood that the first preset threshold, the second preset threshold, and the third preset threshold in this embodiment may correspond to a same value, or different values.

In this embodiment, after the generating unit 502 generates the relationship prediction matrix, the entity prediction matrix and the alignment matrix, the extracting unit 503 extracts the target triplet in the to-be-processed text using the generated relationship prediction matrix, entity prediction matrix and alignment matrix, and then, takes the extracted target triplet as the information extraction result of the to-be-processed text.

Specifically, when the extracting unit 503 extracts the target triplet in the to-be-processed text using the generated relationship prediction matrix, entity prediction matrix and alignment matrix, an adopted optional implementation may include: determining a subject start token and an object start token corresponding to a same relationship type according to the relationship prediction matrix; determining an entity start token and an entity end token corresponding to a same entity type according to the entity prediction matrix; determining an entity and an object corresponding to the same relationship type in the to-be-processed text according to the subject start token and the object start token corresponding to the same relationship type, as well as the entity start token and the entity end token corresponding to the same entity type; combining each relationship type and the entity and the object corresponding to the relationship type to obtain at least one candidate triplet; and selecting a triplet meeting a preset requirement from the obtained at least one candidate triplet as the target triplet according to the alignment matrix.

That is, the extracting unit 503 extracts the target triplet from the to-be-processed text using the relationship prediction matrix, the entity prediction matrix and the alignment matrix sequentially, such that interference of overlap information may be avoided, all triplets included in the to-be-processed text may be extracted as far as possible, and the accuracy of the extracted target triplet is improved.

When the extracting unit 503 determines the subject start token and the object start token corresponding to the same relationship type according to the relationship prediction matrix, an adopted optional implementation may include: taking an element with a value of 1 in the relationship prediction matrix as a target element; and taking a token of a column where the target element is located as a start token of a relationship subject type or a start token of a relationship object type of a row where the target element is located.

When the extracting unit 503 determines the entity start token and the entity end token corresponding to the same entity type according to the entity prediction matrix, an adopted optional implementation may include: determining a target element with a value of 1 in the entity prediction matrix; and taking a token of a column where the determined target element is located as a start token of an entity start type or an end token of an entity end type of a row where the target element is located.

When the extracting unit 503 selects the triplet meeting the preset requirement from the obtained at least one candidate triplet as the target triplet according to the alignment matrix, an adopted optional implementation may include: for each candidate triplet, under a condition that a subject end token and an object end token in the candidate triplet are determined to have element values of 1 in the alignment matrix, taking the candidate triplet as the target triplet.

In the technical solution of the present disclosure, the acquisition, storage and application of involved user personal information are in compliance with relevant laws and regulations, and do not violate public order and good customs.

According to the embodiment of the present disclosure, there are also provided an electronic device, a readable storage medium and a computer program product.

Figure 6:
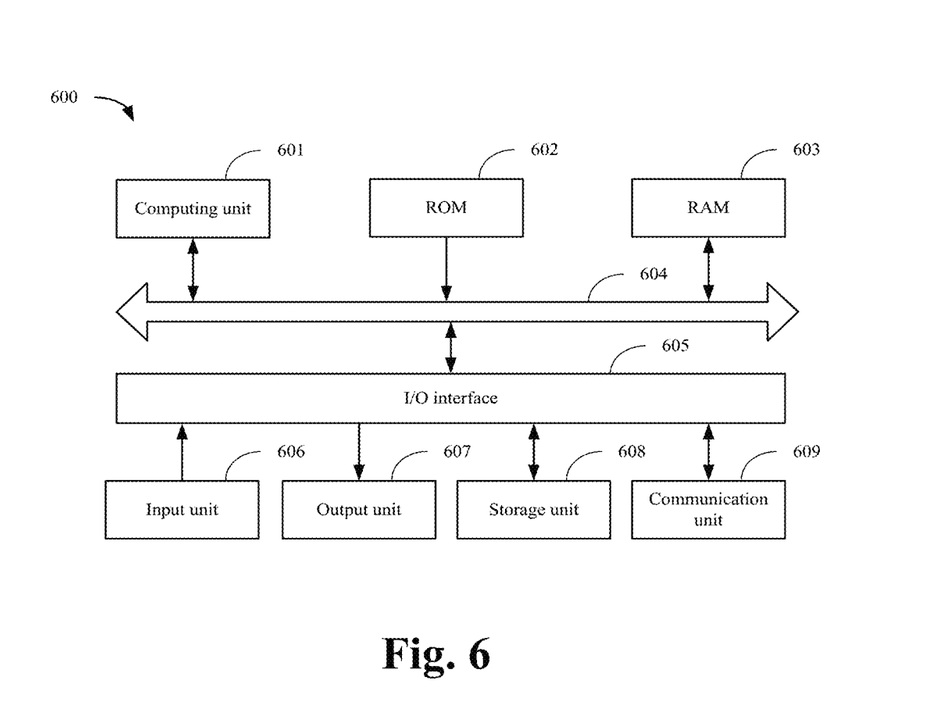
FIG. 6 is a block diagram of an electronic device configured to implement an information extraction method according to embodiments of the present disclosure.

FIG. 6 is a block diagram of an electronic device configured to implement the information extraction method according to the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 6, the device 600 includes a computing unit 601 which may perform various appropriate actions and processing operations according to a computer program stored in a read only memory (ROM) 602 or a computer program loaded from a storage unit 608 into a random access memory (RAM) 603. Various programs and data necessary for the operation of the device 600 may be also stored in the RAM 603. The computing unit 601, the ROM 602, and the RAM 603 are connected with one other through a bus 604. An input/output (I/O) interface 605 is also connected to the bus 604.

The multiple components in the device 600 are connected to the I/O interface 605, and include: an input unit 606, such as a keyboard, a mouse, or the like; an output unit 607, such as various types of displays, speakers, or the like; the storage unit 608, such as a magnetic disk, an optical disk, or the like; and a communication unit 609, such as a network card, a modem, a wireless communication transceiver, or the like. The communication unit 609 allows the device 600 to exchange information/data with other devices through a computer network, such as the Internet, and/or various telecommunication networks.

The computing unit 601 may be a variety of general and/or special purpose processing components with processing and computing capabilities. Some examples of the computing unit 601 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 601 performs the methods and processing operations described above, such as the information extraction method. For example, in some embodiments, the information extraction method may be implemented as a computer software program tangibly contained in a machine readable medium, such as the storage unit 608.

In some embodiments, part or all of the computer program may be loaded and/or installed into the device 600 via the ROM 602 and/or the communication unit 609. When the computer program is loaded into the RAM 603 and executed by the computing unit 601, one or more steps of the information extraction method described above may be performed. Alternatively, in other embodiments, the computing unit 601 may be configured to perform the information extraction method by any other suitable means (for example, by means of firmware).

Various implementations of the systems and technologies described herein may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable information extraction apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. An information extraction method, comprising:
   acquiring to-be-processed text to obtain a semantic vector of each token in the to-be-processed text;
   generating a relationship prediction matrix, an entity prediction matrix and an alignment matrix according to each token in the to-be-processed text and the semantic vector of each token; and
   extracting a target triplet in the to-be-processed text using the relationship prediction matrix, the entity prediction matrix and the alignment matrix, and taking the target triplet as an information extraction result of the to-be-processed text,
   wherein the extracting the target triplet in the to-be-processed text using the relationship prediction matrix, the entity prediction matrix and the alignment matrix comprises:
      determining a subject start token and an object start token corresponding to a same relationship type according to the relationship prediction matrix;
      determining an entity start token and an entity end token corresponding to a same entity type according to the entity prediction matrix;
      determining an entity and an object corresponding to the same relationship type in the to-be-processed text according to the subject start token and the object start token corresponding to the same relationship type, as well as the entity start token and the entity end token corresponding to the same entity type;
      combining each relationship type and the entity and the object corresponding to the relationship type to obtain at least one candidate triplet; and
      selecting a triplet meeting a preset requirement from the at least one candidate triplet as the target triplet according to the alignment matrix.

2. The method according to claim 1, wherein the generating the relationship prediction matrix according to each token in the to-be-processed text and the semantic vector of each token comprises:
   acquiring at least one relationship type, each relationship type comprising a relationship subject type and a relationship object type;
   taking the at least one relationship type as a row in the relationship prediction matrix, and taking each token in the to-be-processed text as a column in the relationship prediction matrix; and
   obtaining values of different elements in the relationship prediction matrix according to the semantic vector of the token of each column and the relationship type of each row.

3. The method according to claim 2, wherein the obtaining values of different elements in the relationship prediction matrix according to the semantic vector of the token of each column and the relationship type of each row comprises:
   for each element in the relationship prediction matrix, determining a token and a relationship type corresponding to the element;
   performing calculation according to the semantic vector of the determined token and the determined relationship type to obtain a calculation result of the element; and
   under a condition that the calculation result is determined to exceed a first preset threshold, setting the value of the element to 1.

4. The method according to claim 1, wherein the generating the entity prediction matrix according to each token in the to-be-processed text and the semantic vector of each token comprises:

acquiring at least one entity type, each entity type comprising an entity start type and an entity end type;

taking the at least one entity type as a row in the entity prediction matrix, and taking each token in the to-be-processed text as a column in the entity prediction matrix; and obtaining values of different elements in the entity prediction matrix according to the semantic vector of the token of each column and the entity type of each row.

5. The method according to claim 4, wherein the obtaining values of different elements in the entity prediction matrix according to the semantic vector of the token of each column and the entity type of each row comprises:

for each element in the entity prediction matrix, determining a token and an entity type corresponding to the element;

performing calculation according to the semantic vector of the determined token and the determined entity type to obtain a calculation result of the element; and under a condition that the calculation result is determined to exceed a second preset threshold, setting the value of the element to 1.

6. The method according to claim 1, wherein the generating the alignment matrix according to each token in the to-be-processed text and the semantic vector of each token comprises:

taking each token in the to-be-processed text both as a row and a column in the alignment matrix; and obtaining values of different elements in the alignment matrix according to the semantic vector of the token of each column and the semantic vector of the token of each row.

7. The method according to claim 6, wherein the obtaining values of different elements in the alignment matrix according to the semantic vector of the token of each column and the semantic vector of the token of each row comprises:

for each element in the alignment matrix, determining a row token and a column token corresponding to the element;

performing calculation according to a semantic vector of the determined row token and a semantic vector of the determined column token to obtain a calculation result of the element; and under a condition that the calculation result is determined to exceed a third preset threshold, setting the value of the element to 1.

8. The method according to claim 1, wherein the determining the subject start token and the object start token corresponding to the same relationship type according to the relationship prediction matrix comprises:

taking an element with the value of 1 in the relationship prediction matrix as a target element; and taking a token of a column where the target element is located as a start token of a relationship subject type or a start token of a relationship object type of a row where the target element is located.

9. The method according to claim 1, wherein the determining the entity start token and the entity end token corresponding to the same entity type according to the entity prediction matrix comprises:

taking an element with the value of 1 in the entity prediction matrix as a target element; and taking a token of a column where the target element is located as a start token of an entity start type or an end token of an entity end type of a row where the target element is located.

10. The method according to claim 1, wherein the selecting a triplet meeting a preset requirement from the at least one candidate triplet as the target triplet according to the alignment matrix comprises:

for each candidate triplet, under a condition that a subject end token and an object end token in the candidate triplet are determined to have element values of 1 in the alignment matrix, taking the candidate triplet as the target triplet.

11. An electronic device, comprising:

at least one processor; and a memory connected with the at least one processor communicatively;

wherein the memory stores instructions executable by the at least one processor to enable the at least one processor to perform an information extraction method comprising:

acquiring to-be-processed text to obtain a semantic vector of each token in the to-be-processed text;

generating a relationship prediction matrix, an entity prediction matrix and an alignment matrix according to each token in the to-be-processed text and the semantic vector of each token; and extracting a target triplet in the to-be-processed text using the relationship prediction matrix, the entity prediction matrix and the alignment matrix, and taking the target triplet as an information extraction result of the to-be-processed text, wherein the extracting the target triplet in the to-be-processed text using the relationship prediction matrix, the entity prediction matrix and the alignment matrix comprises:

determining a subject start token and an object start token corresponding to a same relationship type according to the relationship prediction matrix;

determining an entity start token and an entity end token corresponding to a same entity type according to the entity prediction matrix;

determining an entity and an object corresponding to the same relationship type in the to-be-processed text according to the subject start token and the object start token corresponding to the same relationship type, as well as the entity start token and the entity end token corresponding to the same entity type;

combining each relationship type and the entity and the object corresponding to the relationship type to obtain at least one candidate triplet; and selecting a triplet meeting a preset requirement from the at least one candidate triplet as the target triplet according to the alignment matrix.

12. The electronic device according to claim 11, wherein the generating the relationship prediction matrix according to each token in the to-be-processed text and the semantic vector of each token comprises:

acquiring at least one relationship type, each relationship type comprising a relationship subject type and a relationship object type;

taking the at least one relationship type as a row in the relationship prediction matrix, and taking each token in the to-be-processed text as a column in the relationship prediction matrix; and obtaining values of different elements in the relationship prediction matrix according to the semantic vector of the token of each column and the relationship type of each row, comprising:

for each element in the relationship prediction matrix, determining a token and a relationship type corresponding to the element;
performing calculation according to the semantic vector of the determined token and the determined relationship type to obtain a calculation result of the element; and
under a condition that the calculation result is determined to exceed a first preset threshold, setting the value of the element to 1.

13. The electronic device according to claim 11, wherein the generating the entity prediction matrix according to each token in the to-be-processed text and the semantic vector of each token comprises:
acquiring at least one entity type, each entity type comprising an entity start type and an entity end type;
taking the at least one entity type as a row in the entity prediction matrix, and taking each token in the to-be-processed text as a column in the entity prediction matrix; and
obtaining values of different elements in the entity prediction matrix according to the semantic vector of the token of each column and the entity type of each row comprising:
for each element in the entity prediction matrix, determining a token and an entity type corresponding to the element;
performing calculation according to the semantic vector of the determined token and the determined entity type to obtain a calculation result of the element; and
under a condition that the calculation result is determined to exceed a second preset threshold, setting the value of the element to 1.

14. The electronic device according to claim 11, wherein the generating the alignment matrix according to each token in the to-be-processed text and the semantic vector of each token comprises:
taking each token in the to-be-processed text both as a row and a column in the alignment matrix; and
obtaining values of different elements in the alignment matrix according to the semantic vector of the token of each column and the semantic vector of the token of each row, comprising:
for each element in the alignment matrix, determining a row token and a column token corresponding to the element;
performing calculation according to a semantic vector of the determined row token and a semantic vector of the determined column token to obtain a calculation result of the element; and
under a condition that the calculation result is determined to exceed a third preset threshold, setting the value of the element to 1.

15. The electronic device according to claim 11, wherein the determining the subject start token and the object start token corresponding to the same relationship type according to the relationship prediction matrix comprises:
taking an element with the value of 1 in the relationship prediction matrix as a target element; and
taking a token of a column where the target element is located as a start token of a relationship subject type or a start token of a relationship object type of a row where the target element is located.

16. The electronic device according to claim 11, wherein the determining the entity start token and the entity end token corresponding to the same entity type according to the entity prediction matrix comprises:
taking an element with the value of 1 in the entity prediction matrix as a target element; and
taking a token of a column where the target element is located as a start token of an entity start type or an end token of an entity end type of a row where the target element is located.

17. The electronic device according to claim 11, wherein the selecting a triplet meeting a preset requirement from the at least one candidate triplet as the target triplet according to the alignment matrix comprises:
for each candidate triplet, under a condition that a subject end token and an object end token in the candidate triplet are determined to have element values of 1 in the alignment matrix, taking the candidate triplet as the target triplet.

18. A non-transitory computer readable storage medium with computer instructions stored thereon, wherein the computer instructions are used for causing a computer to perform an information extraction method comprising:
acquiring to-be-processed text to obtain a semantic vector of each token in the to-be-processed text;
generating a relationship prediction matrix, an entity prediction matrix and an alignment matrix according to each token in the to-be-processed text and the semantic vector of each token; and
extracting a target triplet in the to-be-processed text using the relationship prediction matrix, the entity prediction matrix and the alignment matrix, and taking the target triplet as an information extraction result of the to-be-processed text,
wherein the extracting the target triplet in the to-be-processed text using the relationship prediction matrix, the entity prediction matrix and the alignment matrix comprises:
determining a subject start token and an object start token corresponding to a same relationship type according to the relationship prediction matrix;
determining an entity start token and an entity end token corresponding to a same entity type according to the entity prediction matrix;
determining an entity and an object corresponding to the same relationship type in the to-be-processed text according to the subject start token and the object start token corresponding to the same relationship type, as well as the entity start token and the entity end token corresponding to the same entity type;
combining each relationship type and the entity and the object corresponding to the relationship type to obtain at least one candidate triplet; and
selecting a triplet meeting a preset requirement from the at least one candidate triplet as the target triplet according to the alignment matrix.

* * * * *